United States Patent
Breed et al.

(10) Patent No.: US 10,067,341 B1
(45) Date of Patent: Sep. 4, 2018

(54) ENHANCED HEADS-UP DISPLAY SYSTEM

(71) Applicant: Intelligent Technologies International, Inc., Miami Beach, FL (US)

(72) Inventors: David S Breed, Miami Beach, FL (US); Oleksandr T Shostak, Kyiv (UA)

(73) Assignee: Intelligent Technologies International, Inc., Miami Beach, FL (US)

( * ) Notice: Subject to any disclaimer, the term of this patent is extended or adjusted under 35 U.S.C. 154(b) by 46 days.

(21) Appl. No.: 14/614,105

(22) Filed: Feb. 4, 2015

Related U.S. Application Data

(60) Provisional application No. 61/935,682, filed on Feb. 4, 2014.

(51) Int. Cl.
  *G09G 5/00* (2006.01)
  *G02B 27/01* (2006.01)
  *G06K 9/00* (2006.01)

(52) U.S. Cl.
  CPC ......... G02B 27/01 (2013.01); G06K 9/00832 (2013.01)

(58) Field of Classification Search
  CPC .............................. G02B 27/01; G06K 9/00832
  USPC ...................................................... 345/8, 173
  See application file for complete search history.

(56) References Cited

U.S. PATENT DOCUMENTS

| | | | |
|---|---|---|---|
| 5,635,922 A | 6/1997 | Cho et al. | |
| 5,742,264 A | 4/1998 | Inagaki et al. | |
| 5,790,085 A | 8/1998 | Hergesheimer | |
| 5,917,460 A | 6/1999 | Kodama | |
| 5,966,680 A | 10/1999 | Butnaru | |
| 6,124,647 A | 9/2000 | Marcus et al. | |
| 6,291,906 B1 | 9/2001 | Marcus et al. | |
| 6,349,001 B1 | 2/2002 | Spitzer | |
| 6,534,884 B2 | 3/2003 | Marcus et al. | |
| 6,574,538 B2 | 6/2003 | Sasaki | |
| 6,793,242 B2 | 9/2004 | Breed et al. | |
| 7,050,897 B2 | 5/2006 | Breed et al. | |
| 7,126,583 B1 | 10/2006 | Breed | |

(Continued)

OTHER PUBLICATIONS

Cars and Augmented reality, downloaded from http://www.zurichinsurance.ie/blog/cars-and-augmented-reality.htm, available at least as early as Jan. 27, 2014.

(Continued)

*Primary Examiner* — Srilakshmi K Kumar
*Assistant Examiner* — Chineyere Wills-Burns
(74) *Attorney, Agent, or Firm* — Brian Roffe

(57) ABSTRACT

Arrangement for a vehicle includes a heads-up display (HUD) system that displays content to an occupant of a vehicle, a processor that directs the heads-up display system to display content related to a lane being traveled by the vehicle, a scene data generating system that obtains information about an object in an environment around the vehicle, and an occupant monitoring system that monitors the occupant and detects movement of at least one part of the occupant. The processor is coupled to the scene data generating system and the occupant monitoring system and causes enhanced display of content by the heads-up display system additional to the content related to the lane being traveled by the vehicle, based on the information obtained by the scene data generating system and movement of the part of the occupant as detected by the occupant monitoring system.

23 Claims, 2 Drawing Sheets

(56) References Cited

U.S. PATENT DOCUMENTS

| | | |
|---|---|---|
| 7,375,620 B2 | 5/2008 | Balbale et al. |
| 7,418,170 B2 | 8/2008 | Mukawa et al. |
| 7,617,037 B2 | 11/2009 | Desense et al. |
| 7,755,508 B2 | 7/2010 | Watanabae et al. |
| 7,902,102 B2 | 4/2011 | Breed |
| 7,918,781 B1 | 4/2011 | Smyth et al. |
| 7,924,146 B2 | 4/2011 | Seder et al. |
| 8,032,264 B2 | 10/2011 | Breed |
| 8,164,543 B2 | 4/2012 | Seder et al. |
| 8,179,604 B1 | 5/2012 | Prada Gomez et al. |
| 8,203,502 B1 | 6/2012 | Chi et al. |
| 8,269,652 B2 | 9/2012 | Seder et al. |
| 8,482,486 B2 | 7/2013 | Seder et al. |
| 8,558,759 B1 | 10/2013 | Prada Gomez et al. |
| 8,576,073 B2 | 11/2013 | Mooring et al. |
| 9,069,166 B2 | 6/2015 | Abdollahi et al. |
| 9,110,502 B2 | 8/2015 | Fink |
| 9,421,866 B2 | 8/2016 | Madau et al. |
| 9,626,072 B2 | 4/2017 | Feit et al. |
| 9,646,313 B2 | 5/2017 | Kim et al. |
| 9,696,814 B2 | 7/2017 | Takada et al. |
| 2002/0169583 A1* | 11/2002 | Gutta .................. A61B 5/7264 702/188 |
| 2005/0156817 A1 | 7/2005 | Iba |
| 2005/0195128 A1 | 9/2005 | Sefton |
| 2005/0278098 A1* | 12/2005 | Breed ................ B60R 21/0134 701/45 |
| 2007/0057781 A1* | 3/2007 | Breed .................... B60K 35/00 340/457.1 |
| 2008/0122737 A1 | 5/2008 | Lea et al. |
| 2008/0158096 A1* | 7/2008 | Breed .................... B60N 2/002 345/7 |
| 2009/0002142 A1 | 1/2009 | Morimoto et al. |
| 2009/0290079 A1 | 11/2009 | Evans et al. |
| 2010/0103075 A1 | 4/2010 | Kalaboukis et al. |
| 2010/0125816 A1 | 5/2010 | Bezos |
| 2010/0157433 A1 | 6/2010 | Mukawa et al. |
| 2010/0241311 A1 | 9/2010 | Baumann et al. |
| 2010/0253493 A1 | 10/2010 | Szczerba et al. |
| 2010/0253541 A1* | 10/2010 | Seder .................... G01S 13/723 340/905 |
| 2010/0253542 A1 | 10/2010 | Seder et al. |
| 2010/0253543 A1 | 10/2010 | Szczerba et al. |
| 2010/0253593 A1 | 10/2010 | Seder et al. |
| 2010/0253596 A1 | 10/2010 | Szczerba et al. |
| 2010/0253598 A1 | 10/2010 | Szczerba et al. |
| 2010/0253602 A1 | 10/2010 | Szczerba et al. |
| 2010/0253918 A1 | 10/2010 | Seder et al. |
| 2010/0292886 A1 | 11/2010 | Szczerba et al. |
| 2011/0095908 A1* | 4/2011 | Nadeem .................. B60H 3/00 340/905 |
| 2011/0270522 A1 | 11/2011 | Fink |
| 2012/0027373 A1 | 2/2012 | Chuang et al. |
| 2012/0028680 A1* | 2/2012 | Breed ...................... B60C 11/24 455/556.1 |
| 2012/0188148 A1 | 7/2012 | DeJong |
| 2012/0212398 A1 | 8/2012 | Border et al. |
| 2013/0016218 A1 | 1/2013 | Asao et al. |
| 2013/0076881 A1 | 3/2013 | Takahashi et al. |
| 2013/0097557 A1* | 4/2013 | Madau ...................... A61B 5/18 715/810 |
| 2013/0106674 A1 | 5/2013 | Wheeler et al. |
| 2013/0127980 A1* | 5/2013 | Haddick .................. G06F 3/013 348/14.08 |
| 2014/0160170 A1* | 6/2014 | Lyons ...................... G09G 5/38 345/676 |
| 2014/0267400 A1* | 9/2014 | Mabbutt ............... G06T 19/006 345/633 |
| 2014/0362113 A1* | 12/2014 | Benson .............. G02B 27/0172 345/633 |
| 2015/0015479 A1* | 1/2015 | Cho ........................ G06F 3/013 345/156 |
| 2015/0367859 A1* | 12/2015 | Roth ...................... B60K 37/00 701/36 |

OTHER PUBLICATIONS

Pioneer touts world's first car GPS with augmented reality HUD, Jon Fingas, May 9, 2012, downloaded from www.engadget.com.

Reevu aims to be first to bring a motorcycle helmet HUD to market, by Loz Blain, Jul. 23, 2013, downloaded from www.gizmag.com.

New Augmented Reality HUD is a Fighter Jet Display for Your Car, by Damon Lavrinc, Sep. 6, 2013, downloaded from www.wired.com.

New App Brings Augmented Reality HUD to Your Windshield, by Daniel Starkey, Nov. 16, 2013, downloaded from www.tomshardware.com.

General Motors Wants to Augment Your Windshield, by Chris Cameron, Mar. 19, 2010, downloaded from www.readwrite.com.

HUDs Let You Keep Your Eyes on the Road, Albrecht Richer, Jabil, Jun. 20, 2013.

Navdy: In Car Heads Up Display w/ Gesture & Voice Commands, by Gadget Junkie—Aug. 5, www.gadgetify.com, retrieved Sep. 5, 2017.

Exploride: A Transparent Standalone Heads Up Display for Your Car, Date Published: Aug. 24, 2015, www.odditymall.com, retrieved Sep. 5, 2017.

\* cited by examiner

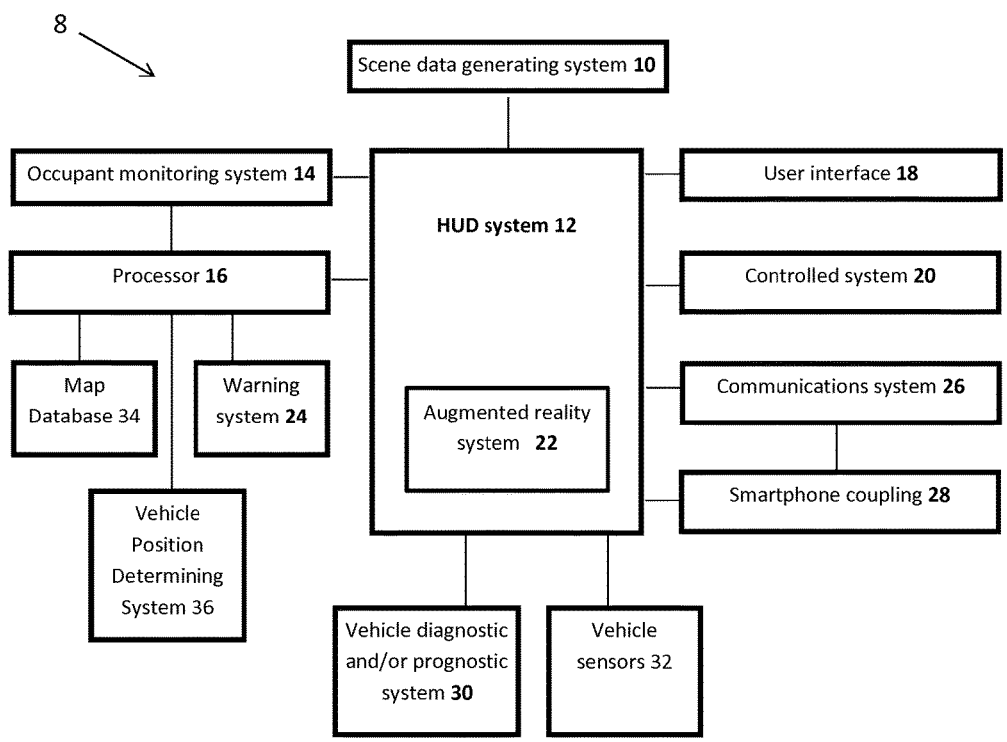
FIG. 1
FIG. 2
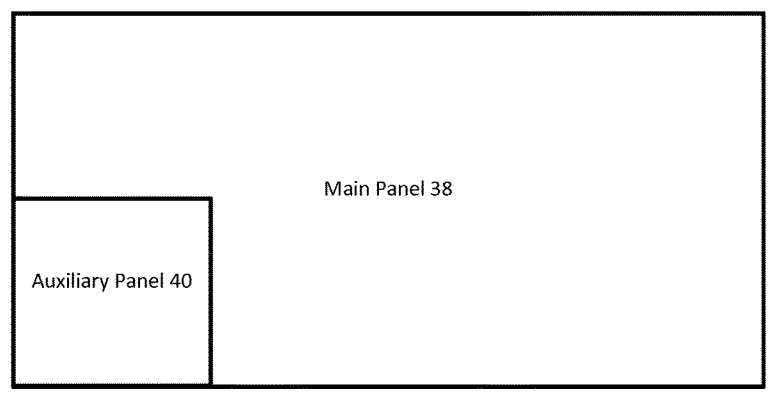

ENHANCED HEADS-UP DISPLAY SYSTEM

FIELD OF THE INVENTION

The present invention relates generally to display of images on a heads-up display to a driver of a vehicle, and more particularly to display of enhanced content or objects to the occupant.

BACKGROUND OF THE INVENTION

In an existing heads up display, information is projected onto a specially treated portion of the windshield and reflected into the eyes of the driver. An important component of a head-up display system is known as the combiner. The combiner is positioned forward of the driver and extends partly across his or her view of the real world scene. It is usually either on the interior surface of or laminated inside of the windshield. It is constructed to transmit light from the real world scene ahead of the vehicle and to reflect light information of one or more particular wavelengths propagating from a source within the vehicle. The information is projected onto the combiner using suitable optical elements. The light rays reflected by the combiner are typically collimated to present an image of the information focused at optical infinity permitting the driver to simultaneously view the real world scene and the displayed information without changing eye focus.

Some combiners are simply semi-reflecting mirrors while a particularly effective combiner can be constructed using a hologram or a holographic optical element. In a currently used heads up display in motor vehicles, the motorist views the forward outside real world scene through the windshield. Information pertaining to the operational status of the vehicle is displayed on a heads up display system providing vehicle information, such as fuel supply and vehicle speed, positioned within the motorist's field of view through the windshield thereby permitting the motorist to safely maintain eye contact with the real world scene while simultaneously viewing the display of information.

OBJECTS AND SUMMARY OF THE INVENTION

An object of one or more embodiments of the present invention is to provide an arrangement and method to display of images on a heads-up display to a driver of a vehicle, and more particularly to display of enhanced content or objects to the occupant.

An arrangement for a vehicle in accordance with the invention includes a heads-up display (HUD) system that displays content to an occupant of a vehicle, a processor that directs the heads-up display system to display content related to a lane being traveled by the vehicle, a scene data generating system that obtains information about one or more objects in an environment around the vehicle, and an occupant monitoring system that monitors the occupant and detects movement of at least one part of the occupant. The processor is coupled to the scene data generating system and the occupant monitoring system and causes enhanced display of content by the heads-up display system additional to the content related to the lane being traveled by the vehicle, based on the information obtained by the scene data generating system and movement of the at least one part of the occupant as detected by the occupant monitoring system.

The scene data generating system may include at least one imaging device. In this case, the processor includes a pattern recognition algorithm that processes images obtained by the at least one imaging device into an identity of any objects in the images. The enhanced content is displayed based on the identity of any objects.

A map database containing traffic management signs having known positions may be provided. The processor is configured to access the database and cause the additional display of one or more traffic management signs by the heads-up display system based on position of the vehicle. The position of the vehicle may be determined by a position determining system, e.g., a GPS system, that determines its position and in view of its co-location with or presence in the vehicle, is considered to be the same as the vehicle's position.

The HUD system may be configured to display the enhanced content on a discrete part of a windshield of the vehicle while the content related to the lane being traveled by the vehicle is displayed on a different part of the windshield. The scene data generating system may be configured to be fixed relative to the vehicle in a position in which it operatively obtains information about any objects alongside and behind the vehicle, in which case, the enhanced content corresponds to a view through a side-mounted rearview mirror of the vehicle. The scene data generating system may be alternatively or additionally be configured to be fixed relative to the vehicle in a position in which it operatively obtains information about any objects behind the vehicle, in which case, the enhanced content corresponds to a view through a compartment-mounted rearview mirror of the vehicle.

The scene data generating system may be configured to determine speed or velocity of any objects, in which case, the HUD system is configured to display the speed or velocity in association with any objects. The scene data generating system may additionally or alternatively be configured to determine an identity of any objects, in which case, the HUD system is configured to display an icon representative of the identity of any of the objects.

The processor may be coupled to a map database and configured to control the HUD system to display status of variable traffic management structure as enhanced content. The status might include current condition and time remaining in current condition. The processor may be configured to determine whether the vehicle can comply with the traffic management structure based on the status of the variable traffic management structure, position and speed of the vehicle and if not, control the HUD system to provide a warning of potential non-compliance. A communications system may be coupled to the processor, in which case, the processor may be configured to control the variable traffic management structure based on the position and speed of the vehicle.

The occupant monitoring system may be configured to detect a predetermined movement of the head of the occupant and initiate display of the enhanced content based thereon. The predetermined movement may be turning of the occupant's head to a side, in which case, the processor is configured to respond to the detection of predetermined movement by the occupant monitoring system and cause display of objects by the HUD system to the side of the vehicle to which the occupant turned their head.

The occupant monitoring system may be configured to detect a predetermined movement of a hand of the occupant and initiate display of the enhanced content based thereon. The occupant monitoring system may be additionally or alternatively configured to detect a predetermined oral command by the occupant and initiate display of the enhanced content based thereon.

An arrangement for a vehicle in accordance with the invention includes a heads-up display (HUD) system that displays content to an occupant of a vehicle and includes an augmented reality system that is configured to enable the HUD display system to separately display content in or on first and second different, discrete portions of a windshield of the vehicle, i.e., there may not be any overlap between the first and second portions of the windshield. The arrangement also includes a processor that directs the heads-up display system to display content related to a lane being traveled by the vehicle in the first portion of the windshield, and a scene data generating system that obtains information about any objects in an environment around the vehicle the scene data generating system comprising at least one imaging device that images the environment around the vehicle. An occupant monitoring system monitors the occupant and detects movement of at least one part of the occupant. The processor is coupled to the scene data generating system, the occupant monitoring system and a map database and causes enhanced display of content by the HUD in the second portion of the windshield based on the information obtained by the scene data generating system, content of the map database relative to location of the vehicle and movement of the at least one part of the occupant as detected by the occupant monitoring system. The arrangement also includes a coupling for coupling to a smartphone. The processor is coupled to the coupling and enables control of the smartphone via the coupling upon command by the occupant.

A method for controlling a heads-up display in a vehicle in accordance with the invention includes displaying content on a first portion of a windshield of the vehicle, obtaining information about an environment around the vehicle, detecting movement of at least one part of the occupant, and displaying content on a second portion of the windshield discrete from the first portion based on the obtained information and the detected occupant movement.

The detection of occupant movement may entail detecting a predetermined turning movement of the head of the occupant, and the display of content on the second portion of the windshield may entail displaying on the second portion, a view rearward and to the side to which the occupant turned their head. The display of content on the second portion of the windshield may entail only temporarily displaying the content. The second portion of the windshield may be rendered temporarily opaque while the content is being displayed thereon.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIG. 1 is a schematic of a system in accordance with the invention; and

FIG. 2 is a view of the windshield of a vehicle showing multiple, separated display panels.

DETAILED DESCRIPTION OF THE INVENTION

Figure 3:
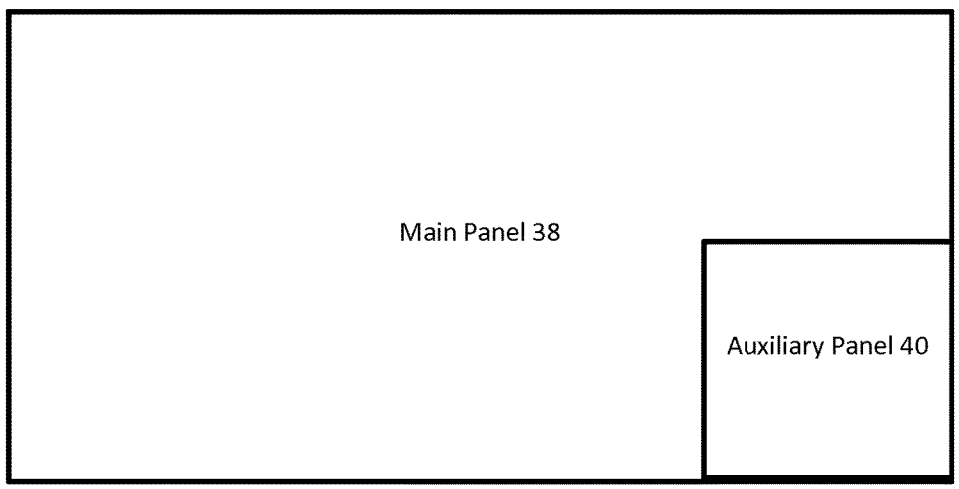
FIG. 3 is another view of the windshield of a vehicle showing multiple, separated display panels.

In a vehicle that travels on land, when a display or projection from a heads up display covers a significant proportion of the vehicle's windshield, the visibility of the travel lane and objects in front of the vehicle to the vehicle operator can be enhanced so as to augment the scene for the vehicle operator. For example, in a car, the driver's visibility of the road and objects in or around the road and in front of the car can be enhanced so as to augment the scene for the driver. For the following description, the vehicle will be considered a motor vehicle travelling on a road. However, the invention is equally applicable to other types of vehicles that travel in defined lanes, such as airplanes on taxiways.

Referring to FIG. 1, components of an arrangement for controlling a display in a vehicle in accordance with the invention are schematically depicted. The arrangement 8 includes a scene data generating system 10 mounted on the vehicle and coupled to a heads-up display (HUD) system 12. The HUD system 12 includes, incorporates, is associated with or coupled to an augmented reality system 22. The HUD system 12 is controlled by a processor 16 that also controls an occupant monitoring system 14 and a warning system 24. The HUD system 12 is also coupled to the occupant monitoring system 14 to receive information therefrom.

Additional inputs to or effect of control of the HUD system 12 may be provided by one or more user interfaces 18. Moreover, one or more controlled systems 20 are controlled by the user interface 18 or by information provided by the occupant monitoring system 14, based potentially on the content of the display being displayed by the HUD system 12 and through exerted control by the processor 16. Thus, instead of indirect connections between the occupant monitoring system 14 and the user interface 18, and the controlled systems 20 via the HUD system 12, there may be a direct connection.

Even further, additional inputs to the HUD system 12 may be provided by a communications system 26, a smartphone or comparable electronic device through a smartphone coupling 28, vehicle diagnostic and/or prognostic sensors system 30 and vehicle sensors 32.

Each of the components and the manner in which each can be utilized in combination with other components is described below.

The scene data generating system 10 may be used to cause display of enhanced objects by the HUD system 12. The present invention relates partly to the enhancement of already existing content, i.e., the display of additional objects, indicia, road signs, etc., to what is already being displayed or projected by the HUD system 12. These additional objects are derived in several ways described below.

In one embodiment, the additional objects are displayed by the HUD system 12 on a discrete portion of the windshield of the vehicle, i.e., not the entire portion of the windshield or not the entire portion of the windshield being used for the co-existing display by the HUD system 12. Nevertheless, this portion may be a substantial portion of the windshield. As used herein, by enhanced, it may be considered that the image or display being generated by the HUD system 12 is not a conventional display but rather includes additional features not currently displayed. These additional features or objects may be derived from information obtained by the scene data generating system 10.

For example, the scene data generating system 10 may be used to locate edges of the road on which the vehicle is travelling and also the presence of objects on the road in front of the vehicle. The scene data generating system 10 may comprise a forward viewing camera, an impulse illumination system operating in conjunction with the forward viewing camera, and a light valve and that individually, in combination or redundantly, locate the road edges and/or the presence of objects on the road in front of the vehicle. Instead of cameras, any other image obtaining device may be used. The impulse illumination system may be infrared based, and in particular, operate in an eye-safe infrared range. The light valve may be a Kerr or Pokel cell, or other comparable apparatus.

More generally, range gating may be used with Kerr or Pokel cells, or equivalent, to reduce reflections from fog, rain, snow etc. The manner in which range gating is used to reduce and potentially eliminate unwanted reflections is known to those skilled in the art to which this invention pertains. Its use when obtaining data about objects for enhanced display by a HUD system 12 in all of the manners described herein is not believed to have been previously undertaken. Range gating for use in bad weather may be activated when weather sensors on the vehicle provide data about the need or advantage of using range gating. Moreover, the vehicle's communications system may be provided with information about weather that is processed by the processor into an indication of the need or desirability to use range gating. A signal to activate range gating may be provided with weather information received by the vehicle's communications system.

Using similar or different equipment, the scene data generating system 10 may be used to locate the presence of objects on the road alongside or behind the vehicle. The scene data generating system 10 may comprise one or more sideways or rearward viewing camera, an impulse illumination system operating in conjunction with each of the sideways or rearward viewing camera, and a respective light valve and that individually, in combination or redundantly, locate the presence of objects on the road alongside or behind the vehicle.

Fisheye or wide angle lens cameras can be useful in one embodiment, when part of the scene data generating system 10, for observing the environment surrounding the vehicle for these applications. In a similar manner, when the operator is attempting to parallel park, a panel view showing the edge of the vehicle and the available parking space along with the locations of forward and rearward parked vehicles can be provided on the display or image projected by the HUD system 12 to aid the operator in parallel parking. The digitized range to vehicles and objects, e.g., determined by the scene data generating system 10, can also be determined using radar, lidar, ultrasound or other technology.

The scene data generating system 10 may be configured to determine not only the presence of objects, but also their absolute speed or velocity or their speed or velocity relative to the vehicle. This information may be used by the scene data generating system 10 to provide signals to the HUD system 12 to cause display of the objects in appropriate locations.

The scene data generating system 10 may be configured to determine the identity or identification of objects. Object identification is important for crash assessment, and thus could provide input to a crash notification system on the vehicle (not shown). Pattern recognition technology could be used in a processor associated with the scene data generating system 10 to identify the objects (whether processor 16 or another processor). Generally, a pattern recognition algorithm would be trained or generated, in a manner known to those skilled in the art, e.g., by providing different objects, exposing the scene data generating system 10 to the different objects in a controlled setting, and then developing an algorithm from data sets including the information obtained by the scene data generating system 10 (e.g., images from the cameras or signals derived from such images) and the known identity of the objects. Once trained, the pattern recognition algorithm can receive data from the scene data generating system 10 from an unknown object and output the most likely identity of the object.

Another source for objects to provide in the enhanced display by the HUD system 12 is a map database 34 that can show the existence of a traffic management structure such as a stop sign or traffic signal, but not the state of a traffic signal. The HUD system 12 could receive signals about the location of traffic management structure to include in the enhanced display from an on-board map database 34 and/or from an off-vehicle database via the communications system 26.

To address the status of variable traffic management structure, in some cases, a traffic signal can send a wireless message to the vehicle indicating its state and if green how soon it is likely to change to red. Processor 16 could determine whether the vehicle is complying with or can comply with the indication of the status of the traffic light and if the driver appears to be unwilling to comfortably stop in time, the HUD system 12 can be configured to flash a warning and if that warning is not heeded, then the vehicle can be automatically brought to a stop (i.e., one of the controlled systems 20 is a vehicle braking system). Alternatively, a communication can be sent to a traffic light via communications system 26 causing it to delay a change in its state to permit the vehicle to safely pass through the intersection while delaying the start of cross traffic.

The heads-up display (HUD) system 12 is coupled to the scene data generating system 10. Images of the road edges may be derived from data obtained by the scene data generating system 10 and displayed by the HUD system 12 onto the windshield of the vehicle, i.e., projected thereon in a manner known to those skilled in the art to which this invention pertains. Images of objects in front of the vehicle may additionally or alternatively be derived from data obtained by the scene data generating system 10 and displayed by the HUD system 12 onto the windshield of the vehicle. Object image display is particularly useful under conditions of poor visibility for the operator of the vehicle.

If the location of the vehicle operator's head is known relative to the display provided by the HUD system 12 on the windshield, then objects can be accurately placed in the field of vision of the operator at their appropriate locations. Additionally, radar can be used for the purpose of detecting the presence of, and distances to, objects in the vehicle's path.

The vehicle operator will be able to see on the display provided by the HUD system 12, enhanced images of the road edges and/or objects such as vehicles, pedestrians, animals, etc., under normal conditions or more beneficially for optimized use of the invention, under conditions of inclement weather and reduced visibility, such as heavy rain, fog, snow or smoke.

The HUD system 12 may be configured to project the enhanced display that appears as a separate panel so as not to confuse the driver with objects that are in front of the vehicle. In this case, a small portion of the vehicle's windshield can be temporarily rendered opaque using LCD technology, for example. The HUD system 12 would therefore project a typical display in the main portion of the display and the enhanced functionality, i.e., the additional objects, in a separate panel. FIG. 2 shows an example of what the HUD system 12 would display. In the main panel 38, the usual content of the HUD system 12 is displayed while in the auxiliary panel 40, the additional objects are displayed, which additional objects may be derived from movement of a part of the occupant, e.g., the occupant's head. The auxiliary panel 40 may be discrete from the main panel 38, i.e., they do not overlap.

Alternatively, the auxiliary panel 40 can provide a display which is similar to one that would be seen through a side-mounted rearview mirror. Thus, the driver can get a view of either the area on the right or left side of the vehicle without having to strain to see what is alongside or behind the vehicle in adjacent lanes (with a slight turn of the head and/or other appropriate gesture or oral command as described below). Cameras or other imaging devices would be appropriately provided as part of the scene data generating system 10 and placed to provide the required image(s).

The auxiliary panel 40 can provide a display which is similar to one that would be seen through the compartment-mounted rearview mirror. Thus, the driver can get a view through the rear window of the vehicle without having to look up at the rearview mirror to see what is behind the vehicle. Again, cameras or other imaging devices would be appropriately provided as part of the scene data generating system 10 and placed to provide the required image(s).

The auxiliary panel 40 may be that portion of the windshield which is rendered opaque temporarily, e.g., using LCD technology known to those skilled in the art. The location of the auxiliary panel 40 may be varied depending on the occupant's movement. For example, it may appear on the left side of the windshield when the driver wants to view the scene from the left side outside, rearview mirror, and on the right side of the windshield when the driver wants to view the scene from the right side outside, rearview mirror. The occupant's movement may be detected using any known occupant monitoring system. The system may be designed or trained to interpret directional movement of the driver's head, the driver's finger(s), the driver's hand, etc. The auxiliary panel 40 may remain in the left or right side of the windshield for a predetermined amount of time after it first appears, or until the driver performs a directional movement in the opposite direction.

Figure 4:
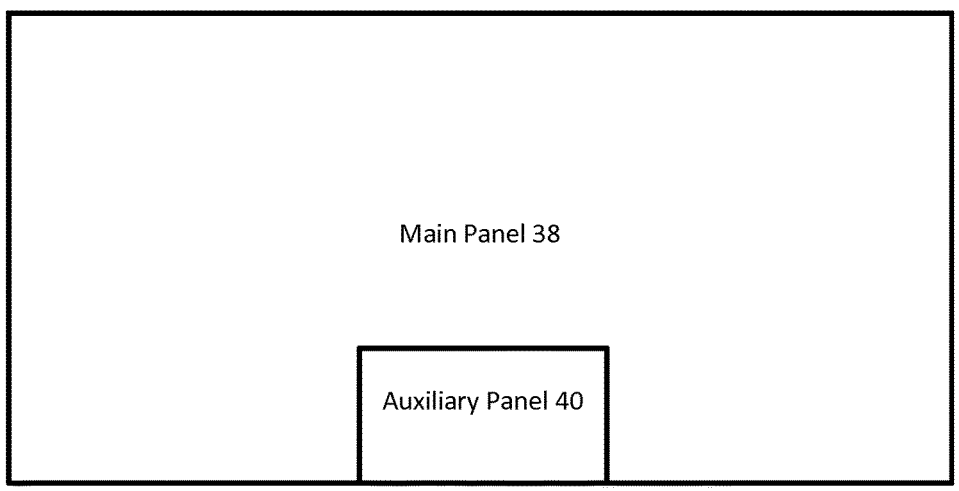
FIG. 4 is still another view of the windshield of a vehicle showing multiple, separated display panels.

As noted above, the content of the temporarily opaque auxiliary panel 40 may also vary, presumably in concordance with location so that when appearing on the left side of the main panel 38, it would display what would appear from the left side-mounted mirror (see FIG. 2) and when appearing on the right side of the main panel 38, it would display what would appear from the right side-mounted mirror (see FIG. 3). As to displaying what would appear from the compartment-mounted rearview mirror, the auxiliary panel 40 may be situated in the middle of panel 36 toward the bottom (see FIG. 4).

HUD system 12 may also incorporate organic LED (OLED) display technology.

Content of the auxiliary panel 40 may be controlled by gestures or movement of the occupant. The position of the operator's head relative to the display provided by the HUD system 12 can be used as a signal to the HUD system 12 that the operator desires enhanced information to be displayed. To this end, the occupant monitoring system 14 is arranged in the vehicle to monitor the occupant, a gesture and/or movement of the occupant, a part of the occupant and/or a gesture or movement of a part or parts of the occupant. Various occupant monitoring systems 14 that are capable of one or more of these functions are known to those skilled in the art to which this invention pertains and all such occupant monitoring systems as well as improvements to such occupant monitoring systems are encompassed within the scope of the invention.

As an example of operation of occupant monitoring system 14, if the driver turns his head to one side or the other side thereby shifting his gaze from one location to another, this can be detected by the occupant monitoring system 14 and upon processing by a processor 16 associated with or part of the occupant monitoring system 14, taken as a signal that the HUD system 12 should display objects that may be present alongside or even slightly behind the vehicle (whether in the main panel 38 or in the auxiliary panel 40). The auxiliary panel 40 may thus display what would appear to be seen if the driver were to look at the left side-mounted or right side-mounted mirror, yet avoids the driver having to turn their head completely to see these mirrors. Moreover, the display in the auxiliary panel 40 may be only temporary and removed after a predetermined time, e.g., ten, fifteen or thirty seconds, or removed after the driver turns their head in the opposite direction. Further, as noted above, the auxiliary panel 40 may be positioned on the side of the windshield to which the driver looks, i.e., a directional movement to the left would cause a view from the left side rear view mirror to appear in an auxiliary panel 40 on the left side of the windshield, and vice versa.

Additionally or alternatively, the display of objects of objects alongside or slightly behind the vehicle can be accomplished through oral commands from the driver. In this regard, the occupant monitoring system 14, in addition to monitoring the occupant for head movement, would also include a sound receiver, e.g., a microphone, with received sounds being processed to determine if they are indicative of commands relating to display of objects by the HUD system 12, e.g., by processor 16.

Control of the content of a display based on detected movement of an occupant's hands, i.e., hand gestures, is disclosed in one of the inventors' earlier patent, U.S. Pat. No. 7,920,102 (incorporated by reference herein). This content is information that is varied based on the occupant's hand movement.

As mentioned above, the present invention relates partly to the enhancement of already existing content, i.e., the display of additional objects, indicia, road signs, etc., to what is already being displayed or projected by the HUD system 12. That is, the occupant moves in order to cause an additional display of objects, and moreover, the occupant movement is not responsive to a preceding query to provide guidance as to how to control the display. For example, a gesture is typically made in response to a query about control of the content of the HUD system so that an upwardly pointed finger is indicative of a positive action (raise temperature) while a downwardly pointed finger is indicative of a negative action (lower temperature), when the system is waiting for a gesture intended to adjust temperature (see U.S. Pat. No. 8,032,264, incorporated by reference herein).

In the current invention, the direction of the occupant's movement, and part of the occupant that is moved, may be pre-correlated to the additional content to be displayed. Thus, a table of occupant movement (of their head, each hand, fingers, etc.) may be composed and provided to the occupant, i.e., in writing, orally when purchasing the vehicle, orally when renting the vehicle, etc. Appropriate pre-determined commands could additionally or alternatively be provided to each occupant of the vehicle, e.g., orally, in writing, or by display on the HUD system 12 itself.

In the latter case, the HUD system 12 would display a list of control commands for the driver to say in order to effect specific command schemes.

The occupant would know that a turn of their head to the left signifies that the HUD system 12 should display objects, in the main panel 38 and/or in the auxiliary panel 40, that may be present alongside (to the left) and/or even slightly behind the vehicle on the left side. The occupant would also know that a turn of their head to the right signifies that the HUD system 12 should display objects in the main and/or auxiliary panel 38, 40 that may be present alongside (to the right) and/or even slightly behind the vehicle on the right side.

This is extremely useful for changing lanes. The driver could merely shift their head to the right when wanting to change lanes to their right, and be provided with additional information in the manner of an augmented or enhanced heads-up display about any objects to the right of the host vehicle. An indication should be provided about the response to the processor 16 so, when there are no objects to additionally display, the occupant does not think that the system did not receive and interpret the right turn of their head. This indication could be provided by the HUD system 12 upon command by the processor 16.

Icons may be used in place of or additional to a visual image of an object identified by the scene data generating system 10, and software to implement icon display may be implemented in the HUD system 12. A mechanism may be provided to enable the driver to switch between the icon representations as the enhanced content on the auxiliary panel 40 and the visual image when the HUD system 12 is capable of both types of displays. In one embodiment, a smaller icon display is used and shows the position of the host vehicle and that of other vehicles surrounding the host vehicle as would be seen from a bird's eye view. This mechanism may be an oral command acted upon by the processor 16 or a switch (not shown) coupled to the processor 16.

A particular icon to project may be determined by the scene data generating system 10. The icon is preferably related to the object, e.g., an icon of a vehicle is displayed when the object alongside or behind the host vehicle is another vehicle. To enable this, pattern recognition technology could be used in a processor associated with the scene data generating system 10 to generate the representative icons (whether processor 16 or another processor). Once trained, the pattern recognition algorithm can receive data from the scene data generating system 10 from an unknown objet and output an icon for the most likely identity of the object.

Similarly, when the operator is attempting to see a traffic light, for example, which is difficult to observe from the location of the vehicle, the traffic light or a representative icon along with its status can be displayed in the operator's field of view if the operator were looking up and the vehicle cameras recognize that there is a traffic signal in a position that is difficult for the driver to see. The status of the traffic light may be obtained from the cameras or another component of the scene data generating system 10, or may be provided via wireless communications, e.g., from a transmitter associated with the traffic light that is configured to broadcast the status of the traffic light.

The display provided by the HUD system 12 can be controlled orally, by gestures, by a touchpad and/or by a mouse pad located, for example, in the center of the steering wheel or at some other convenient location. Such apparatus are generally represented by a user interface 18 in FIG. 1. The HUD system 12 can be turned on or off also by such methods.

Such a touchpad or mouse pad can be incorporated in the airbag cover or attached thereto using thin film technology without significantly interfering with the deployment of an airbag. For those airbag covers that split to allow the airbag to emerge, a thin film technology would be appropriate. In other designs where the airbag cover pops off as the airbag deploys rather than splitting, the touchpad can be integrated into the pop-off cover.

With such an arrangement, an image of the operator's smart phone, for example, can be projected by the HUD system 12, especially when the vehicle is not moving, and the device operated by means of the steering wheel-mounted mouse pad. Thus, all of the functions that can be performed with a hand-held smart phone are available through a projection of the smart phone display by the HUD system 12 coupled with the mouse pad located on the steering wheel or other convenient surface such as an armrest. When the vehicle is in motion, the permitted operations can be significantly curtailed so as not to provide a significant distraction to the driving operation.

Alternatively, the operation of the mouse pad can be limited to very simple inputs and some of the more complicated inputs, such as text messaging, can be accomplished using voice recognition rather than text typing on the mouse pad. The mouse pad additionally can be used to control the HVAC system to provide heating, air-conditioning, and window defrosting operations without requiring the operator to take his eyes off the road. In FIG. 1, controlled system 20 represents the one or more vehicular systems that can be controlled by the user interacting with the user interface 18. Some of these features have been previously disclosed in U.S. Pat. Nos. 7,126,583, 7,920,102, 8,032,264 and 8,068, 942, all of which are incorporated by reference herein.

In place of or in combination with such a mouse pad, eye tracking can be used to control the HUD system 12 as well as other vehicle features. Eye tracking is performed by the occupant monitoring system 14. Using eye tracking, if the operator looks at an object in the environment, for example, the augmented reality system 22 incorporated in or associated with the control component of the HUD system 12 can provide additional information to the operator. This information can include the address or identification of a building or other structure, the contents of a sign, a written or oral description of a point of interest, the name of a cross street, or any other geographic relevant information. The information may be provided from a database or memory component accessible to the control component of the HUD system 12.

If the controls of a vehicle system are displayed by the HUD system 12, then when the driver looks at various choices on the display, the occupant monitoring system 14 can determine that the operator wishes to choose a particular function. For example, if the controls of an HVAC system are being displayed, the operator can increase the temperature in the vehicle, increase the fan speed, turn on the defroster, or perform any other function merely by staring at that particular function. Optionally, the driver would also have to perform a gesture while staring, e.g., stare at a display indicative of fan speed and then tilt their head upward.

The occupant monitoring system 14 would therefore include a camera that observes the eyes of the operator. Alternatively, voice commands or gestures can be used to achieve a similar result. Similarly, through appropriate staring and detection thereof by the occupant monitoring system 14, the control of a smart phone based on its display on the HUD system 12 can be accomplished to, for example, answer a phone call or to send it to voicemail.

Many other functions can similarly be accomplished. For example, by staring at a camera icon being displayed by the HUD system 12, the operator can cause an image to be stored by blinking his eyes. Alternately, the operator can orally say "take a picture" or "start video recording". Thus, there may be control of recording by an imaging system on the vehicle y oral commands, an eye gaze and/or another type of gesture by the driver and/or other vehicle occupant.

For application of the invention as a safety system, if the operating system of the HUD system 12 and/or the processor 16 determines that the vehicle operator is not looking at a potential hazard, then that hazard can be augmented on the windshield and a warning can be issued by the warning system 24. Warning system 24 may be directed to generate a warning if the operator has not observed a pedestrian or bicyclist who is about to cross in front of the vehicle, and/or there is an object laying on the road which the driver will run over if he does not take appropriate action.

Other operational choices that can be presented to the operator include retaining a view of a sign or other infrastructure located object on the windshield to permit the operator time to more carefully observe the object and/or read the sign, for example. This can be useful when the vehicle is rapidly passing a sign that is of interest to the operator.

For many of these observational functions of the environment surrounding the vehicle, a very wide angle lens such as a fisheye lens or other distorting lens can be provided as a component of the scene data generating system 10 and the distorted image corrected using software in the scene data generating system 10 and/or processor 16. In this manner, the camera does not need to be movable and a substantial portion of the surrounding environment can be captured and then the appropriate desired segment of the image can be corrected for display by the HUD system 12.

A video recorder may also be a component of the scene data generating system 10. The video recorder may be configured to allow the driver the option to replay a captured scene as desired.

In some cases, messages displayed on variable message signs on road infrastructure are passed too rapidly by the vehicle, or their view to the driver is blocked by another vehicle or the driver is blinded by the sun, for example, and unable to read their contents. In such a situation, the infrastructure-based signs can additionally broadcast their message from associated transmitters using DSRC and/or other convenient technology and the transmitted message can then be displayed by the HUD system 12. Alternately, the message can be made accessible by an Internet connection to the driver's vehicle and then displayed by the HUD system 12. The data from signs may also be vocalized, i.e., there may be oral communication of sign contents or other information in the environment to the driver or other vehicle occupant. This would entail use of a speaker or other sound generating unit that would be controlled by the processor to announce, for example, sign data.

Gestures can be used in place of and/or to augment eye tracking, in which case, the vehicle operator can point at something he or she sees in the environment and the object and information related to the object can be displayed by the HUD system 12. Additional information about gesture-control of a HUD system is present in U.S. Pat. No. 7,920,102, incorporated by reference herein. In any of these cases, the image displayed by the HUD system 12 can be derived from imaging a portion of the environment using cameras or other imaging devices that are part of the scene data generating system 10 and/or by information from another vehicle or a remote map database. In the latter case, there may be an Internet connection between the remote database and the communications system 26 on the vehicle to facilitate transfer of information for display by the HUD system 12. Thus, a stop sign image or icon, for example, can be derived from the environment or from a map database 34 based on, for example, the position of the vehicle as determined by a vehicle position determining system 36 coupled to the processor 16. The vehicle position determining system 36 may be any known system, whether entirely resident on the vehicle partly resident on the vehicle and partly resident off vehicle but in communication with the vehicle, or entirely off-vehicle and in communication with the vehicle.

Other information can be displayed by the HUD system 12 as with any other convenient display including transcribed voice messages, text messages, the latest news or stock market reports, all of which can include text, icons and images. Oral presentation of the information can be used when the vehicle is moving and it is preferable not to distract the operator.

Objects remote from the vehicle can also be controlled through the HUD interface. For example, a menu of options can be provided to permit the vehicle operator to turn on the outside lights of a home or building, open a garage door or gate, lock or unlock building doors, and/or other similar activities.

The HUD system 12 can provide other information to the operator such as problems in the road ahead. These problems can include congestion, construction, an accident, frozen and/or slippery road surface etc. The HUD system 12 can also recommend to the operator an alternate course and guide the operator through instructions and display images to direct the driver to follow what can be an unfamiliar route in order to avoid or minimize the effect of the problem.

Messages created by the vehicle diagnostic and/or prognostic system 30 can also be displayed by the HUD system 12 to warn the driver of potential vehicle issues. The same messages might also be vocalized.

If the vehicle, or coupled smartphone, is equipped with health or chemical monitoring sensors, the HUD system 12 can be used to display a warning to the vehicle operator which should cause him or her to change his or her plans and even the system can notify a remote site in some cases. The status of the driver's health or drowsiness warning may also be displayed to the driver using the HUD system 12. Health and drowsiness may be determined by occupant monitoring sensors known to those skilled in the art to which this invention pertains.

An alertness determination system, different than or incorporated into the warning system 24, can warn the driver that he or she is getting sleepy and should stop driving. An alcohol sensor, for example, can detect whether there are significant alcohol vapors in the air inside the vehicle indicating that the driver may be intoxicated. These systems can be coupled with sensors which detect the driving behavior of the operator to further confirm the operator's state. Other sensors include heartbeat, glucose monitoring and respiration rate sensors which can give clues to the health or alertness state of the operator, some of which are disclosed in U.S. Pat. Nos. 6,793,242 and 7,050,897, incorporated by reference herein.

From either a visual indication, communication with the infrastructure, or a map database 34, coupled with a monitoring of the vehicle acceleration and velocity, the arrangement in accordance with the invention can determine whether the vehicle is traveling too fast to stop in time for an upcoming stop sign or traffic signal. To this end, the arrangement includes vehicle sensors 32 that detect the vehicle's speed and/or acceleration.

There are also numerous additional applications in addition to those described above. Many changes, modifications, variations and other uses and applications of the subject invention will become apparent to those skilled in the art after considering this specification and the accompanying drawing that disclose the preferred embodiments thereof. All such changes, modifications, variations and other uses and applications that do not depart from the spirit and scope of the invention are deemed to be covered by the invention which is limited only by the following claims.

The HUD system 12 may take various forms and generally be any type of image forming system that is capable of forming an image in front of a driver. One particular display system uses projection technology, such as a digital light processor (DLP) sold by Texas Instruments. Additional information about such a processor and its capability for use in HUD system 12 is set forth in "HUDs Let You Keep Your Eyes on the Road", by Jabil Albrecht Richer, Jun. 20, 2013.

Additional information about the objects around the vehicle that can be obtained by the scene data generating system 10 is distance between the vehicle and the object. This information may be obtained from successive images or through other means, e.g., radar. The scene data generating system 10 would provide information about the distance to the processor 16 or the processor 16 could determine the distance information from data provided by the scene data generating system 10. The distance between the vehicle and the object, when the object has a fixed position, could also be provided from a map database and transferred to the processor 16 through the communications system 26.

Regardless of how the processor 16 obtains information about the distance between an object and the vehicle, it can display this distance along with the object in the main panel 38 when the object is being displayed in the main panel 38 or in the auxiliary panel 40 when the object is being displayed in the auxiliary panel 40. The distance may be displayed within an outline of the object, alongside the object, and in many other different ways. The distance changes during movement of the vehicle and/or the object and is thus recalculated and the display updated at an update rate or based on updating conditions.

The HUD system 12 can be connected to an appropriately configured smartphone or to the Internet via the coupling 28, where a digital assistant or equivalent can be trained to answer questions from the vehicle operator. Thus, the operator can request the location of the nearest gas station orally and the HUD system 12 can display a map and/or provide route guidance images permitting the operator to prepare for turns etc. As such, the personal smartphone of the driver is integrated into the HUD system 12. The coupling may be any known coupling, e.g., a port on the vehicle and a cable having appropriate adapters on both ends, one to mate with the vehicle and other to mate with the smartphone.

In conjunction with the display of the smartphone by the HUD system 12, the vehicle may include steering wheel-mounted touch pads or other user interfaces (represented by 18 in FIG. 1). Using the user interfaces 18, the occupant can direct commands to their smartphone when coupled to the vehicle via coupling 28.

There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. An arrangement for a vehicle, comprising:
   a heads-up display (HUD) system that displays content to an occupant of a vehicle in a position in front of the occupant when the occupant is present in the vehicle;
   a scene data generating system that obtains information about an environment around the vehicle;
   an occupant monitoring system that monitors the occupant when present in the vehicle and detects movement of at least one part of the occupant; and
   a processor coupled to said HUD system, to said scene data generating system and to said occupant monitoring system,
   said processor directing said HUD system to display first content related to a road or lane being traveled by the vehicle and to selectively initiate display of additional, second content that is different than and additional to the display of the first content related to the road or lane being traveled by the vehicle, while the first content is being displayed, whereby prior to initiation of the display of the additional, second content, the additional, second content is not displayed,
   said processor directing said HUD system to display the additional, second content in one of a plurality of different locations relative to a location in which the first content is being displayed, the location in which the additional, second content is displayed being in a direction of movement of the at least one part of the occupant from an initial state, as detected by said occupant monitoring system, such that movement of the at least one part of the occupant in different directions from the initial state causes the additional, second content to be displayed by said HUD system in different locations,
   said processor determining the additional, second content to display based on the information obtained by said scene data generating system and based on the same direction of movement of the at least one part of the occupant from the initial state, as detected by said occupant monitoring system, that determines in which one of the plurality of different locations the additional, second content is displayed by said HUD system such that movement of the at least one part of the occupant in different directions from the initial state causes different additional, second content to be displayed by said HUD system, and
   whereby the additional, second content includes at least one of an object exterior of the vehicle, an edge of the road or lane on which the vehicle is traveling, an indication relating to traffic management structure for the road or lane on which the vehicle is traveling and a road sign for the road or lane on which the vehicle is traveling.

2. The arrangement of claim 1, wherein said scene data generating system comprises at least one imaging device, said processor including a pattern recognition algorithm that processes images obtained by said at least one imaging device into an identity of any objects in the images, the additional, second content being displayed based on the identity of any objects in the images.

3. The arrangement of claim 1, further comprising:
a position determining system that determines position of the vehicle; and
a map database containing traffic management signs having known positions,
said HUD system receiving data from said map database about position of traffic management signs and being configured to cause the display of one or more traffic management signs by said HUD system as the additional, second content based on position of the vehicle determined by said position determining system whereby different positions of the vehicle cause different additional, second content to be displayed by said HUD system.

4. The arrangement of claim 1, wherein said HUD system is configured to display the additional, second content on a discrete part of a windshield of the vehicle while the first content related to the road or lane being traveled by the vehicle is displayed on a different part of the windshield such that there is no overlap between the additional, second content and the first content related to the road or lane being traveled by the vehicle.

5. The arrangement of claim 4, wherein said scene data generating system is configured to be located relative to the vehicle in a position in which said scene data gathering system operatively obtains information about an object alongside and behind the vehicle and in the environment around the vehicle, whereby the additional, second content corresponds to a view by the occupant through a side-mounted rearview mirror of the vehicle.

6. The arrangement of claim 4, wherein said scene data generating system is configured to be located relative to the vehicle in a position in which said scene data generating system operatively obtains information about any objects behind the vehicle and in the environment around the vehicle, whereby the additional, second content corresponds to a view by the occupant through a compartment-mounted rearview mirror of the vehicle.

7. The arrangement of claim 1, wherein said scene data generating system is configured to obtain data about the presence of any objects exterior of the vehicle over time and in the environment around the vehicle and determine speed or velocity of any present objects from the obtained data, said HUD system being configured to display the determined speed or velocity in association with any present objects as the additional, second content.

8. The arrangement of claim 1, wherein said scene data generating system is configured to determine an identity of any objects in the environment around the vehicle, said HUD system being configured to display an icon representative of the determined identity of any of the objects as the additional, second content.

9. The arrangement of claim 1, wherein said processor is further configured to control said HUD system to display status of a variable traffic management structure for the road or lane being traveled by the vehicle and that have a plurality of different conditions as the additional, second content, the status of the variable traffic management structure including current condition of the variable traffic management structure and time remaining in the current condition of the variable traffic management structure.

10. The arrangement of claim 9, wherein at least one of the plurality of conditions of the variable traffic management structure requires compliance by the vehicle and said processor is configured to determine whether the vehicle can comply with the at least one of the plurality of conditions of the variable traffic management structure by analyzing the current condition of the variable traffic management structure, position and speed of the vehicle relative to the current condition and if said processor determines that the vehicle cannot comply with the current condition of the variable traffic management structure based on such analysis, said processor being configured to direct command signals to said HUD system in order to control said HUD system to provide a warning of potential non-compliance with the current condition.

11. The arrangement of claim 9, wherein the variable traffic management structure is controllable to change its condition, further comprising a communications system coupled to said processor and configured to transmit a communication to cause a change in operation of the variable traffic management structure, said processor being configured to control the variable traffic management structure based on the position and speed of the vehicle by causing transmission of communications to effect control of the variable traffic management structure using said communications system.

12. The arrangement of claim 1, wherein said occupant monitoring system is configured to monitor the head of the occupant and detect turning of the head of the occupant in a predetermined direction based on such monitoring and initiate display of the additional, second content based on detection of the turning of the head of the occupant in the predetermined direction, the head constituting the at least one part of the occupant and turning of the head constituting movement of the head from the initial state, whereby turning of the head of the occupant in different predetermined directions causes display of the different additional, second content at one of the plurality of different locations which is directly in front of the occupant after having turned their head in the predetermined direction.

13. The arrangement of claim 12, wherein the turning of the head of the occupant in the predetermined direction is turning of the occupant's head to a side from a forward-facing orientation which is the initial state, said processor being configured to respond to the detection of the turning of the head of the occupant in the predetermined direction by said occupant monitoring system and initiate display of objects by said HUD system to one of the plurality of different locations which is located on the side of the vehicle to which the occupant turned their head.

14. The arrangement of claim 1, wherein said occupant monitoring system is configured to monitor a hand of the occupant and detect movement of the hand of the occupant in a predetermined direction based on such monitoring and initiate display of the additional, second content based on detection of the movement of the hand of the occupant in the predetermined direction, the hand constituting the at least one part of the occupant, whereby movements of the hand of the occupant in different predetermined directions cause display of the different additional, second content at one of the plurality of different locations.

15. The arrangement of claim 1, wherein said occupant monitoring system is further configured to monitor sound emanating from the occupant and detect a predetermined oral command by the occupant based on such monitoring and initiate display of the additional, second content based on detection of the predetermined oral command by the occupant, whereby different predetermined oral commands by the occupant cause display of the different additional, second content.

16. The arrangement of claim 1, wherein said processor directs said heads-up display to remove the additional, second content, when displayed, after detecting movement of the at least one part of the occupant in a direction opposite to the direction of movement of the at least one part of the occupant that caused the display of the additional, second content.

17. An arrangement for a vehicle, comprising:
a heads-up display (HUD) system that displays content to an occupant of a vehicle, said HUD system being configured to separately display content on a first and a second different, discrete portions of a windshield of the vehicle such that there is no overlap between the content on the first portion and the content on the second portion;
a scene data generating system that obtains information about an environment around the vehicle, said scene data generating system comprising at least one imaging device that images the environment around the vehicle or a map database containing data relating to roadway structures on a road or lane on which the vehicle is travelling and near the vehicle;
an occupant monitoring system that monitors the occupant and detects movement of at least one part of the occupant;
a processor coupled to said HUD system, to said scene data generating system, and to said occupant monitoring system,
said processor directing said HUD system to display first content related to the road or lane being traveled by the vehicle in the first portion of the windshield and to selectively cause display of additional, second content in the second portion of the windshield that is different than and additional to the display of the first content related to the road or lane being traveled by the vehicle, while the first content is being displayed whereby prior to initiation of the display of the additional, second content, the additional, second content is not displayed,
said processor directing said HUD system to display the additional, second content in one of a plurality of different locations relative to a location in which the first content is being displayed, the location in which the additional, second content is displayed being in a direction of movement of the at least one part of the occupant from an initial state, as detected by said occupant monitoring system, such that movement of the at least one part of the occupant in different directions from the initial state causes the additional, second content to be displayed by said HUD system in different locations,
said processor determining the additional, second content to display based on the information obtained by said scene data generating system and based on the same direction of movement of the at least one part of the occupant from the initial state as detected by said occupant monitoring system that determines in which one of the plurality of different locations the additional, second content is displayed by said HUD system such that movement of the at least one part of the occupant in different directions from the initial state causes different additional, second content to be displayed by said HUD system,
whereby the additional, second content includes at least one of an object exterior of the vehicle, an edge of the road or lane on which the vehicle is traveling, an indication relating to traffic management structure for the road or lane on which the vehicle is traveling and a road sign for the road or lane on which the vehicle is traveling.

18. The arrangement of claim 17, wherein said processor directs said heads-up display to remove the additional, second content, when displayed, after detecting movement of the at least one part of the occupant in a direction opposite to the direction of movement of the at least one part of the occupant that caused the display of the additional, second content.

19. A method for controlling a heads-up display in a vehicle, comprising:
displaying first content on a first portion of a windshield of the vehicle, the first content being related to a road or lane being traveled by the vehicle;
obtaining information about an environment around the vehicle using a scene data generating system; and
selectively displaying, using the heads-up display, additional, second content on a second portion of the windshield discrete from the first portion that is different than and additional to the display of the first content related to the road or lane being traveled by the vehicle, while the first content is being displayed and such that there is no overlap between the content being displayed in the first portion and the content being displayed in the second portion,
the step of selectively displaying the additional, second content on the second portion of the windshield comprising:
detecting movement of at least one part of the occupant using an occupant monitoring system;
directing the HUD system to display the additional, second content in one of a plurality of different locations relative to a location in which the first content is being displayed, the location in which the additional, second content is displayed being in a direction of movement of the at least one part of the occupant from an initial state, as detected by the occupant monitoring system, such that movement of the at least one part of the occupant in different directions from the initial state causes the additional, second content to be displayed by the HUD system in different locations,
determining, using a processor, the additional, second content to display based on the obtained information and based on the same direction of the detected movement of the at least one part of the occupant from the initial state that determines in which one of the plurality of different locations the additional, second content is displayed by the HUD system such that detected movement of the at least one part of the occupant in different directions from the initial state causes display of different additional, second content on the second portion of the windshield; and
initiating display of the additional, second content based on the direction of movement of the at least one part of the occupant from the initial state whereby prior to initiation of the display of the additional, second content based on the direction of movement of the at least one part of the occupant from the initial state, the additional, second content is not displayed,
whereby the additional, second content includes at least one of an object exterior of the vehicle, an edge of the road or lane on which the vehicle is traveling, an indication relating to traffic management structure for the road or lane on which the vehicle is traveling and a road sign for the road or lane on which the vehicle is traveling.

20. The method of claim 19, wherein the step of detecting movement of at least one part of the occupant comprises detecting turning of the head of the occupant in a predetermined direction to a side of the vehicle such that the head constitutes the at least one part of the occupant and turning of the head constituting movement of the head from the initial state whereby turning of the head of the occupant in different predetermined directions cause display of the different additional, second content, the step of displaying additional, second content on the second portion of the windshield comprises displaying on the second portion, a view by the occupant rearward and to the side of the vehicle to which the occupant turned their head, the second portion being one of the plurality of different locations which is directly in front of the occupant after having turned their head in the predetermined direction to a side of the vehicle.

21. The method of claim 19, wherein the step of selectively displaying additional, second content on the second portion of the windshield comprises only temporarily displaying the additional, second content on the second portion of the windshield.

22. The method of claim 19, further comprising rendering the second portion of the windshield temporarily opaque while the additional, second content is being displayed on the second portion of the windshield.

23. The method of claim 19, further comprising, when the additional, second content is displayed based on movement of the at least one part of the occupant in a predetermined direction from the initial state, directing the heads-up display to remove the displayed additional, second content when movement of the at least one part of the occupant in a direction opposite to the predetermined direction is detected by the occupant monitoring system.

* * * * *